United States Patent [19]
Weinstein et al.

[11] Patent Number: 6,094,485
[45] Date of Patent: Jul. 25, 2000

[54] SSL STEP-UP

[75] Inventors: Jeff Weinstein, Los Gatos; Tom Weinstein, Sunnyvale; Taher Elgamal, Atherton, all of Calif.

[73] Assignee: Netscape Communications Corporation, Mountain View, Calif.

[21] Appl. No.: 08/933,127

[22] Filed: Sep. 18, 1997

[51] Int. Cl.[7] .................................................... H04K 1/00
[52] U.S. Cl. ............................................. 380/30; 713/200
[58] Field of Search ........................................ 380/30, 45

[56] References Cited

U.S. PATENT DOCUMENTS

| | | | |
|---|---|---|---|
| 4,868,877 | 9/1989 | Fischel | 380/25 |
| 5,323,464 | 6/1994 | Elander et al. | 380/24 |

OTHER PUBLICATIONS

"Microsoft Obtains Government License for Export of 128–Bit Encryption" http://www.microsoft.com/corpinfo/press/Jun. 1997/encryptnpr.htm.
Lash, Alex, "Communicator, IE crypto cleared" http://www.new.com/News/Item/0,4,11831,00,html.
VISA, "SET File Downloads" ©Copyright 1996, 1997.
S/MINE Central ©Copyright 1997 RSA Data Security, Inc.

*Primary Examiner*—Tod R. Swann
*Assistant Examiner*—Todd Jack
*Attorney, Agent, or Firm*—Michael A. Glenn

[57] ABSTRACT

A process is provided that allows an exportable SSL client to negotiate an encrypted session using strong encryption with a server if the server is allowed to use strong encryption. With this process, the SSL client is normally limited to export strength encryption. But, when it is communicating with an approved server, it is able to expand the available set of encryption algorithms to include stronger algorithms/key lengths. The process involves performing an SSL handshake twice. The process begins when a client, i.e. a user, wants to establish a session with a server. The client first initiates a network connection to the server. The first handshake between an export client and an approved server results in an SSL session that uses export strength encryption. This establishes a connection using an exportable cipher suite. The client examines the server's certificate obtained as part of the first handshake. If the server is not approved, the SSL session transfers application data that are protected by the export cipher. If the server is approved, then the client initiates a second handshake, this time allowing stronger cipher suites. The result of the second handshake is an SSL session that uses strong encryption. The SSL session may then be used to transfer application data that are protected by the strong cipher suite. At this point, the process is complete.

28 Claims, 4 Drawing Sheets

SSL STEP-UP

BACKGROUND OF THE INVENTION

1. Technical Field

The invention relates to cryptography. More particularly, the invention relates to the use of cryptography in such a way that it may be exported in accordance with local laws.

2. Description of the Prior Art

The U.S. government currently allows general purpose encryption software to be exported only if it is restricted to small key sizes that provide relatively weak protection of data. The U.S. government allows stronger encryption software to be exported with approval if it is limited to certain applications, such as financial services. Typically special purpose protocols and software have been developed and standardized for each application area to gain government export approval for strong encryption. This is a very expensive and time consuming process. The Secure Sockets Layer (SSL) is a protocol that performs general purpose encryption. This makes it useful for many different types of applications. Applications that require strong encryption have had trouble using SSL because most users run client software that only supports export strength encryption. Because SSL supports general purpose encryption, it is not currently possible to get export permission for strong encryption with SSL. It would be possible to get export approval for client software that limited its use of SSL to applications that conformed to the U.S. government's rules for exporting special purpose strong encryption. If some method could be used to differentiate these uses of SSL from other general purpose uses of SSL on a case by case basis, then the expense and effort of creating special encryption software and protocols could be saved.

SUMMARY OF THE INVENTION

The invention provides a process, referred to as the SSL step up, which allows an exportable SSL client to negotiate an encrypted session using strong encryption with a server if the server is approved for the step up, i.e. if it is allowed to use strong encryption. It is expected that the same criteria are used to grant this approval as is currently used to grant approval to export special purpose strong encryption software. With the SSL step up process, the SSL client is normally limited to export strength encryption. But, when it is communicating with an approved server, it is able to expand the available set of encryption algorithms to include stronger algorithms/key lengths.

The process of the SSL step up involves performing an SSL handshake twice. The process begins when a user desires to establish a session with a server. The client first initiates a network connection to the server. The first handshake between an export client and an approved server results in an SSL session that uses export strength encryption. This establishes a connection using an exportable cipher suite. The client examines the server's certificate obtained as part of the first handshake. If the server is not approved, the SSL session transfers application data that are protected by the export cipher suite. If the server is approved, then the client initiates a second handshake, this time allowing stronger cipher suites. The result of the second handshake is an SSL session that uses strong encryption. The SSL session may then be used to transfer application data that are protected by the strong cipher suite. At this point, the process is complete.

DETAILED DESCRIPTION OF THE INVENTION

The invention provides a process and apparatus that is used by an exportable version of an SSL client (such as Netscape Communicator, which is manufactured by Netscape Communications Corp. of Mountain View, Calif.) to negotiate an encrypted communication session using strong encryption with an SSL server.

Definitions.

As used herein, the following terms are defined as set forth below:

Export Strength Encryption: A software product that uses encryption algorithms in such a way that the U.S. government (or other local government) allows it to be exported to other countries.

SSL Client: The software that initiates the SSL handshake and performs the client side of the handshake protocol. This software could be part of either a client or server product.

SSL Server: The software that performs the server side of the SSL handshake protocol. This software could be part of either a client or server product, but is generally part of a server product.

Negotiate/Handshake: The process by which an SSL client and server agree upon a set of encryption and authentication algorithms, and exchange the data necessary to initiate those algorithms.

General Purpose Encryption: An application of encryption that does not limit the type or size of the data being encrypted. The U.S. government places more restrictions on software that can encrypt any kind of data than it does on software that limits the type and size of the data being encrypted. SSL and S/MIME (specification for secure electronic mail) are considered general purpose encryption protocols because they do not place any limits on the type or size of the data being encrypted.

Special Purpose Encryption: An application of encryption that limits the type and size of the data being encrypted. The U.S. government sometimes gives export permission for stronger encryption algorithms if they are limited in use to a specific purpose and type of data. SET is the "Secure Electronic Transaction" protocol. It provides for secure on-line credit card transactions. The SET protocol is an example of an encryption protocol that was designed to encrypt special purpose data for example, for performing financial transactions.

Strong Encryption: Encryption algorithms and key sizes that are stronger than the U.S. government usually allows to be exported for general purpose encryption.

CA/Certificate Author ity: An entity that issues certificates.

SSL Step Up.

The SSL step up is a mechanism that allows an exportable SSL client to negotiate an encrypted session using strong encryption with a server if the server is approved for the step up, i.e. if it is allowed to use strong encryption. It is expected that the same criteria are used to grant this approval as is currently used to grant approval to export special purpose strong encryption software.

With the SSL step up mechanism, the SSL client is normally limited to export strength encryption. But, when it is communicating with an approved server, it is able to expand the available set of encryption algorithms to include stronger algorithms/key lengths.

Figure 1A:
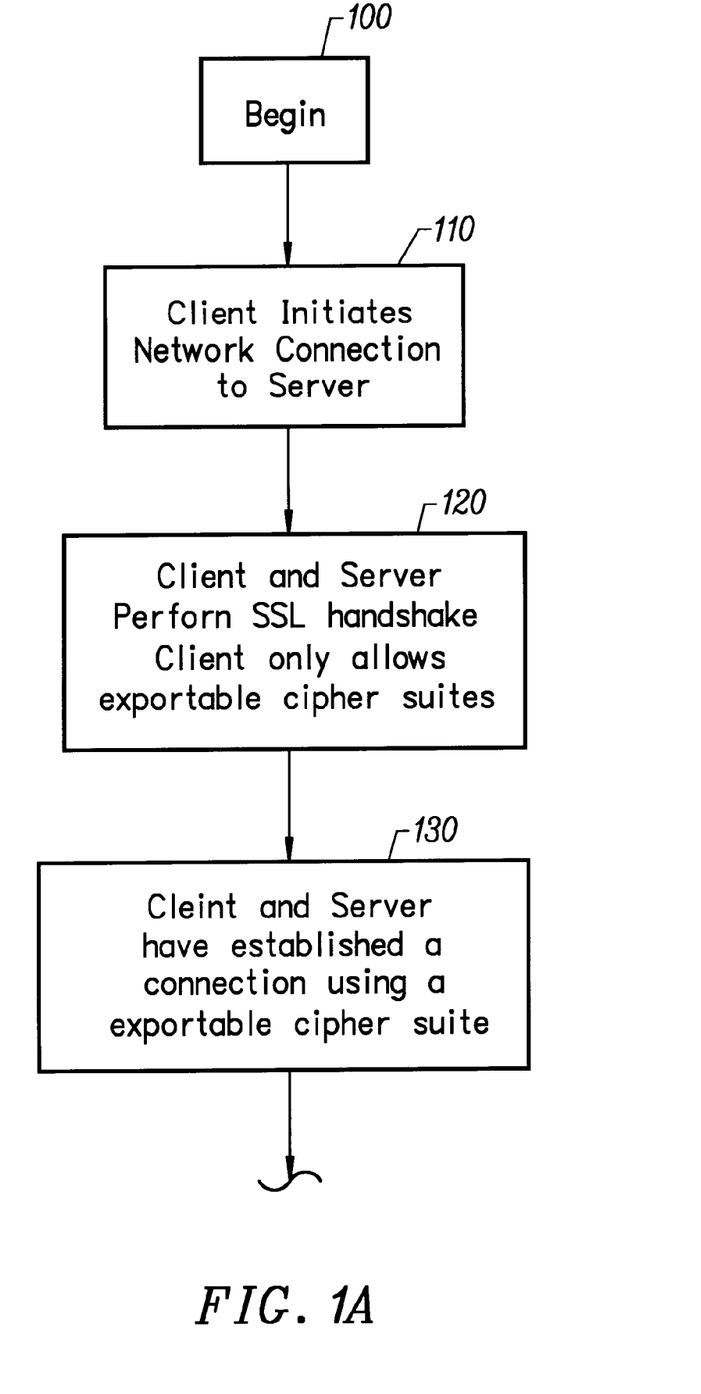
FIG. 1 is a flow diagram showing the SSL step up process according to the invention.
Figure 1B:
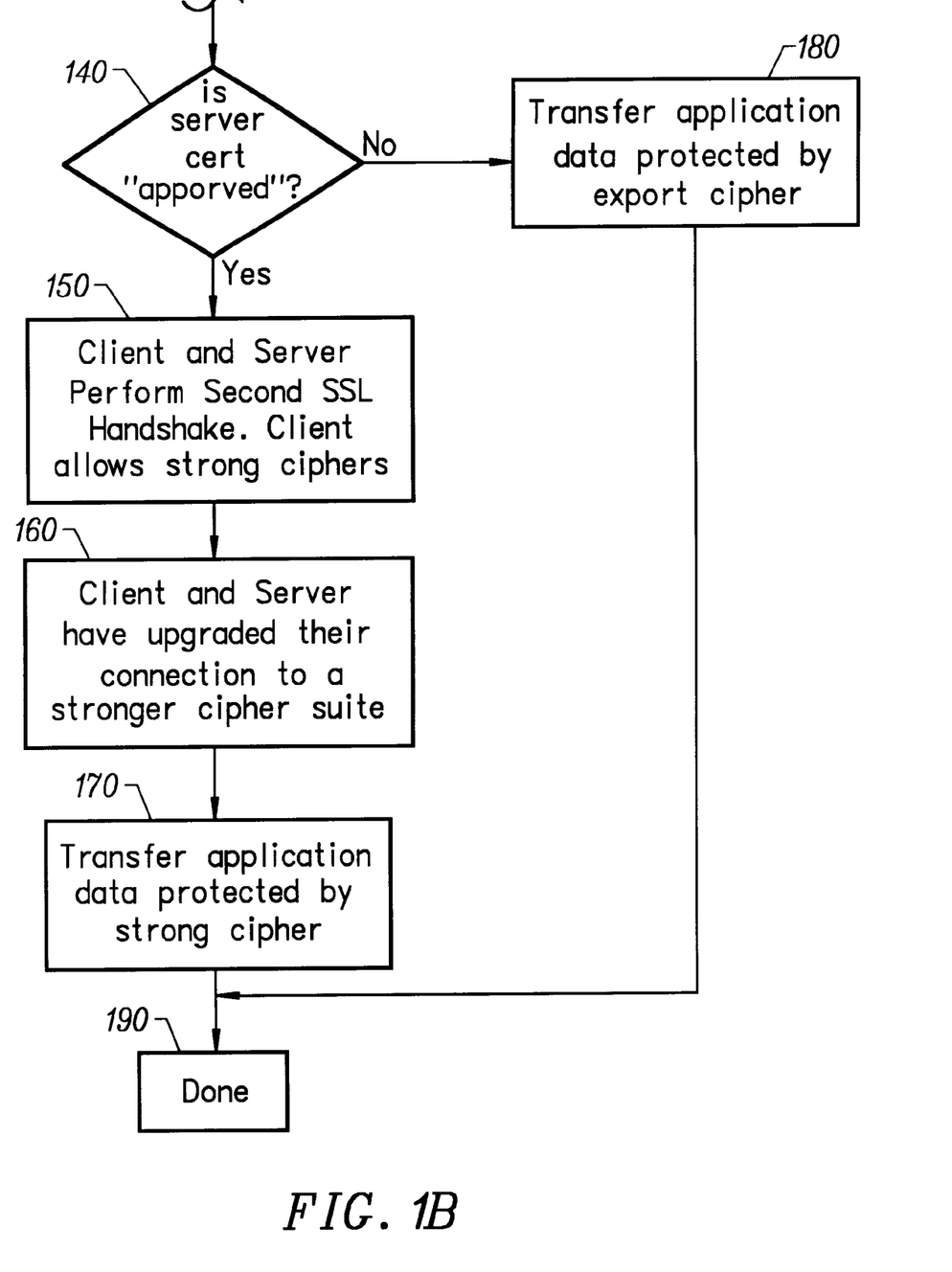

The process of the SSL step up is described in FIG. 1. The process involves performing an SSL handshake twice. The process begins (100) when a user desires to establish a session with a server. The client first initiates a network connection to the server (110). The first handshake between an export client and an approved server results in an SSL session that uses export strength encryption (120). This establishes a connection using an exportable cipher suite (130). The client examines the server's certificate obtained as part of the first handshake (140). If the server is not approved, the SSL session transfers application data that are protected by the export cipher (180). If the server is approved, then the client initiates a second handshake (150), this time allowing stronger cipher suites. The result of the second handshake is an SSL session that uses strong encryption (160). The SSL session may then be used to transfer application data that are protected by the strong cipher suite (170). At this point, the step up process is complete (190).

The use of two consecutive handshakes is required to avoid having to change the SSL protocol. This is due to the ordering of the messages during the SSL handshake protocol. The client sends the list of cipher suites it allows before the server sends it's certificate. The server's certificate is required for the client to tell if the server is approved. This certificate is not available to the client at the time that it must send the list of cipher suites in the first handshake, so the first handshake must be performed with the weaker, export strength algorithms. After the first handshake is complete, the client has the server's certificate and can determine if the server is approved for stronger encryption. In this case, the client performs the second handshake with the expanded list of cipher suites.

There are several ways that the second handshake could be eliminated if the SSL protocol is modified. Because the current version of SSL is widely deployed and well along a lengthy standards process this is not presently deemed practical. Thus, the presently preferred embodiment of the invention employs the two handshake technique in conjunction with existing server software that supports the SSL 3.0 protocol.

The SSL step up technique takes advantage of several features of the SSL 3.0 protocol. The first is the ability to perform multiple handshakes in a single SSL session. This ability was originally designed into the protocol to allow re-keying for long lived sessions. The SSL step up technique also depends on the fact that the strength of the SSL session is not weakened by the initial export strength handshake if it is followed by a second handshake that negotiates a strong cipher suite before any data is transferred.

Identifying Approved Servers.

Figure 2A:
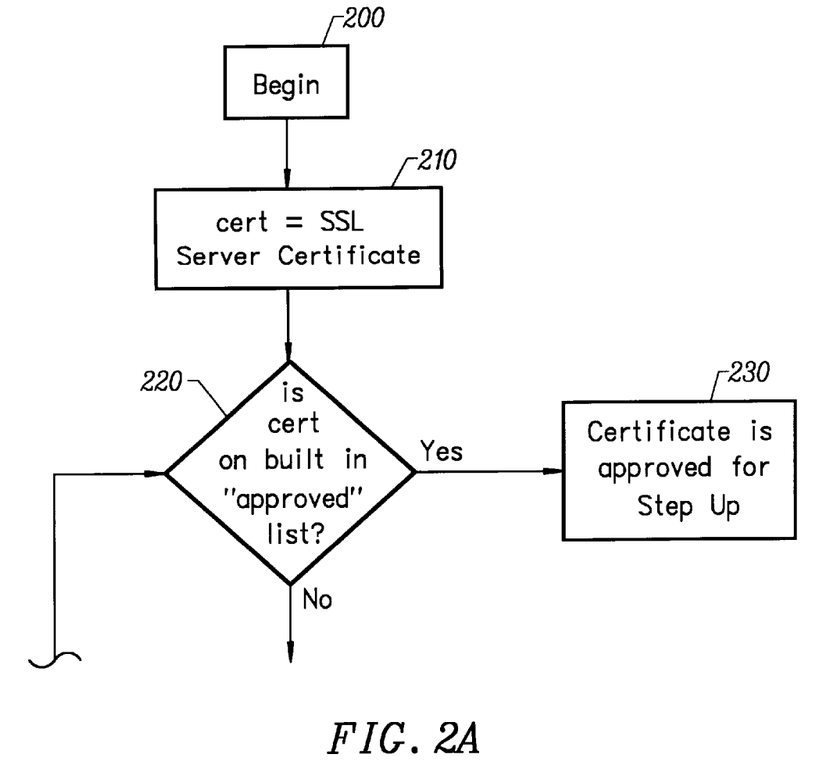
FIG. 2 is a flow diagram showing the process used to verify that a server is approved for the step up according to the invention.
Figure 2B:
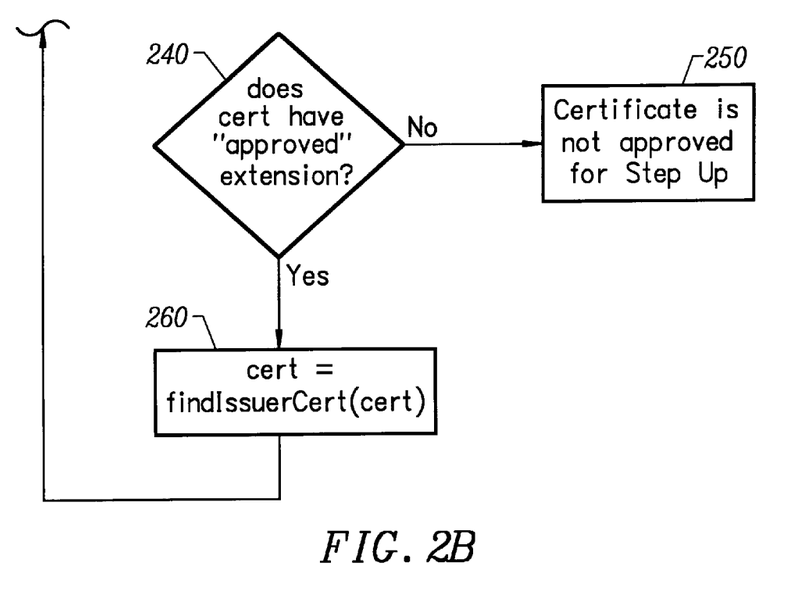

FIG. 2 describes the process used to verify that a server is approved for the step up based on the server's certificate.

The server's certificate chain consists of three types of certificates:
The server's certificate;
Zero or more intermediate CA certificates; and
A trusted root CA certificate.

The verification process begins with the initiation of an SSL session (200), as described above. The server must provide an SSL server certificate (210). The server's certificate and any intermediate CA certificates must contain the certificate extension described below. The trusted root CA certificate must be on a list of CAs that is built into the client software and that are known to be approved for issuing the special step up certificates (220). This list must be built into the client software, and not be configurable by the customer, because the list must only contain CAs that have been approved by the U.S. (or other concerned) government. If the certificate is on the list, then the certificate is approved for step up (230) and the session may proceed using strong encryption. If the certificate is not on the approved list (220), then the process determines if the certificate has an approved extension (240). If the certificate does not have an approved extension, then the certificate is not approved for step up (250). If the certificate does have an approved extension, then a search is performed to find the issuer certificate (260), and the certificate is then compared to the approved list again (220).

A discussion of the policies used to issue the step up certificates is beyond the scope of this document, but they might resemble the policies currently used to approve export of special purpose strong encryption software. Clearly, the invention is readily adapted to operate in connection with any such policy.

Certificate Extension.

The certificate extension that is used to identify server certificates and intermediate CAs that are approved for SSL step up is the extended key usage extension that is described in the PKIX Certificate Profile Specification. (PKIX is the working group of the Internet Engineering Task Force working on public key infrastructure. The document is titled "Internet Public Key Infrastructure, Part I: X.509 Certificate and CRL Profile." This extension is a simple SEQUENCE of OBJECT IDENTIFIERs (OIDs). The sequence must include the following OBJECT IDENTIFIER for SSL step up approval:

ssl-step-up-approval OBJECT IDENTIFIER ::={2 16 840 1 113730 4 1}

The hexadecimal DER encoding of this OID is:
60:86:48:01 :86:f8:42:04:01

The extended key usage extension may contain other usage OIDs in addition to ssl-step-up-approval.

SSL.

The following is a discussion of Version 3.0 of the Secure Sockets Layer (SSL V3.0) protocol, which is a security protocol that provides communications privacy over the Internet. The protocol allows client/server applications to communicate in a way that is designed to prevent eavesdropping, tampering, or message forgery. It should be appreciated that the invention herein described may be used in connection with other protocols, and that the SSL protocol is provided as an example of a protocol for use with the presently preferred embodiment of the invention.

The primary goal of the SSL Protocol is to provide privacy and reliability between two communicating applications. The protocol is composed of two layers. At the lowest level, layered on top of some reliable transport protocol (e.g. TCP), is the SSL Record Protocol. The SSL Record Protocol is used for encapsulation of various higher level protocols. One such encapsulated protocol, the SSL Handshake Protocol, allows the server and client to authenticate each other and to negotiate an encryption algorithm and cryptographic keys before the application protocol transmits or receives its first byte of data. One advantage of SSL is that it is application protocol independent. A higher level protocol can layer on top of the SSL Protocol transparently.

The SSL protocol provides connection security that has three basic properties:
The connection is private. Encryption is used after an initial handshake to define a secret key. Symmetric cryptography is used for data encryption (e.g. DES and RC4)

The peer's identity can be authenticated using asymmetric, or public key, cryptography (e.g. RSA and DSS).

The connection is reliable. Message transport includes a message integrity check using a keyed MAC. Secure hash functions (e.g. SHA and MD5) are used for MAC computations.

The goals of SSL Protocol v3.0, in order of their priority, are:

Cryptographic security: SSL should be used to establish a secure connection between two parties.

Interoperability: Independent programmers should be able to develop applications utilizing SSL 3.0 that are then able to exchange cryptographic parameters successfully without knowledge of one another's code.

Note: It is not the case that all instances of SSL (even in the same application domain) are able to connect successfully. For instance, if the server supports a particular hardware token, and the client does not have access to such a token, then the connection can not succeed.

SSL seeks to provide a framework into which new public key and bulk encryption methods can be incorporated as necessary. This also accomplishes two sub-goals:

To prevent the need to create a new protocol (and risking the introduction of possible new weaknesses); and To avoid the need to implement an entire new security library.

Cryptographic operations tend to be highly CPU intensive, particularly public key operations. For this reason, the SSL protocol has incorporated an optional session caching scheme to reduce the number of connections that need to be established from scratch. Additionally, care has been taken to reduce network activity.

The following discussion concerns the formatting of data in an external representation. The following very basic and somewhat casually defined presentation syntax that is used. The syntax draws from several sources in its structure.

The representation of all data items is explicitly specified. The basic data block size is one byte (i.e. 8 bits). Multiple byte data items are concatenations of bytes, from left to right, from top to bottom. From the byte stream a multi-byte item (a numeric in the example) is formed (using C notation) by:

value=(byte[0] <<8*(n−1))|(byte[1]<<8*(n−2))|...|byte[n−1];

This byte ordering for multi-byte values is the commonplace network byte order or big endian format.

Comments begin with "/*" and end with "*/". Optional components are denoted by enclosing them in italic "[ ]" brackets. Single byte entities containing uninterpreted data are of type opaque.

A vector (one dimension array) is a stream of homogeneous data elements. The size of the vector may be specified at documentation time or left unspecified until runtime. In either case the length declares the number of bytes, not the number of elements, in the vector.

The syntax for specifying a new type T' that is a fixed length vector of type T is:

T T'[n];

Here T' occupies n bytes in the data stream, where n is a multiple of the size of T. The length of the vector is not included in the encoded stream.

In the following example, Datum is defined to be three consecutive bytes that the protocol does not interpret, while Data are three consecutive Datum, consuming a total of nine bytes:

opaque Datum[3]; /* three uninterpreted bytes of data */
Datum Data[9]; /* 3 consecutive 3 byte vectors */

Variable length vectors are defined by specifying a sub-range of legal lengths, inclusively, using the notation . When encoded, the actual length precedes the vector's contents in the byte stream. The length is in the form of a number consuming as many bytes as required to hold the vector's specified maximum (ceiling) length. A variable length vector with an actual length field of zero is referred to as an empty vector:

T T';

In the following example, mandatory is a vector that must contain between 300 and 400 bytes of type opaque. It can never be empty. The actual length field consumes two bytes, a uint16, sufficient to represent the value 400. On the other hand, longer can represent up to 800 bytes of data, or 400 uint16 elements, and it may be empty. Its encoding includes a two byte actual length field prepended to the vector:

opaque mandatory<300 . . . 400>; /* length field is 2 bytes, cannot be empty */
uint16 longer<0 . . . 800>; /* zero to 400 16-bit unsigned integers */

The basic numeric data type is an unsigned byte (uint8). All larger numeric data types are formed from fixed length series of bytes concatenated and are also unsigned. The following numeric types are predefined:

uint8 uint16[2];
uint8 uint24[3];
uint8 uint32[4];
uint8 uint64[8];

An additional sparse data type is available called enum. A field of type enum can only assume the values declared in the definition. Each definition is a different type. Only enumerateds of the same type may be assigned or compared. Every element of an enumerated must be assigned a value, as demonstrated in the following example. Because the elements of the enumerated are not ordered, they can be assigned any unique value, in any order:

enum {e1 (v1), e2 (v1), . . . , en (vN), [(n)]} Te;

Enumerateds occupy as much space in the byte stream as would its maximal defined ordinal value. The following definition would cause one byte to be used to carry fields of type Color:

enum {red(3), blue(5), white(7)} Color;

One may optionally specify a value without its associated tag to force the width definition without defining a superfluous element. In the following example, Taste consumes two bytes in the data stream but can only assume the values 1, 2, or 4:

enum {sweet(1), sour(2), bitter(4), (32000)} Taste;

The names of the elements of an enumeration are scoped within the defined type. In the first example, a fully qualified reference to the second element of the enumeration would be Color.blue. Such qualification is not required if the target of the assignment is well specified:

Color color=Color.blue; /* overspecified, but legal */
Color color=blue; /* correct, type is implicit */

For enumerateds that are never converted to external representation, the numerical information may be omitted:

enum {low, medium, high} Amount;

Structure types may be constructed from primitive types for convenience. Each specification declares a new, unique type. The syntax for definition is much like that of C:

struct {
    T1 f1;
    T2 f2;
    . . .
    Tn fn;
}[T];

The fields within a structure may be qualified using the type's name using a syntax much like that available for enumerateds. For example, T.f2 refers to the second field of the previous declaration. Structure definitions may be embedded.

Defined structures may have variants based on some knowledge that is available within the environment. The selector must be an enumerated type that defines the possible variants the structure defines. There must be a case arm for every element of the enumeration declared in the select. The body of the variant structure may be given a label for reference. The mechanism by which the variant is selected at runtime is not prescribed by the presentation language:

```
struct {
    T1 f1;
    T2 f2;
    . . .
    Tn fn;
    select (E) {
    case e1: Te1;
    case e2: Te2;
    . . .
    case en: Ten;
    } [fv];
}[Tv];
```

For example:
```
enum {apple, orange} VariantTag;
struct {
    uint16 number;
    opaque string<0 . . . 10>; /* variable length */
} V1;
struct {
    uint32 number;
    opaque string[10]; /* fixed length */
} V2;
struct {
    select (VariantTag) { /* value of variant selector is implicit */
    case apple: V1; /* definition of VariantBody, tag=apple */
    case orange: V2; /* definition of VariantBody, tag=orange */
    } variant body; /* optional label on the variant portion */
} VariantRecord;
```

Variant structures may be qualified (narrowed) by specifying a value for the selector prior to the type. For example, an:
orange VariantRecord
is a narrowed type of a VariantRecord containing a variant__ body of typeV2.

Cryptographic Operations Within SSL.

The four cryptographic operations digital signing, stream cipher encryption, block cipher encryption, and public key encryption, are designated digitally signed, stream-ciphered, block-ciphered, and public-key-encrypted, respectively. A field's cryptographic processing is specified by prepending an appropriate key word designation before the field's type specification. Cryptographic keys are implied by the current session state.

In digital signing, one-way hash functions are used as input for a signing algorithm. In RSA signing, a 36-byte structure of two hashes (one SHA and one MD5) is signed (encrypted with the private key). In DSS, the 20 bytes of the SHA hash are run directly through the digital signing algorithm with no additional hashing.

In stream cipher encryption, the plaintext is exclusive-ORed with an identical amount of output generated from a cryptographically-secure keyed pseudorandom number generator.

In block cipher encryption, every block of plaintext encrypts to a block of ciphertext. Because it is unlikely that the plaintext (whatever data is to be sent) breaks neatly into the necessary block size (usually 64 bits), it is necessary to pad out the end of short blocks with some regular pattern, usually all zeroes.

In public key encryption, one-way functions with secret trapdoors are used to encrypt the outgoing data. Data encrypted with the public key of a given key pair can only be decrypted with the private key, and vice versa.

In the following example:
```
stream-ciphered struct {
    uint8 field1;
    uint8 field2;
    digitally signed opaque hash[20];
} UserType;
```
The contents of hash are used as input for a signing algorithm, then the entire structure is encrypted with a stream cipher.

Typed constants can be defined for purposes of specification by declaring a symbol of the desired type and assigning values to it. Under-specified types (opaque, variable length vectors, and structures that contain opaque) cannot be assigned values. No fields of a multi-element structure or vector may be elided.

For example,
```
struct {
    uint8 f1;
    uint8 f2;
} Example1;
Example1 ex1={1, 4}; /* assigns f1=1, f2=4*/
```

SSL Protocol.

SSL is a layered protocol. At each layer, messages may include fields for length, description, and content. SSL takes messages to be transmitted, fragments the data into manageable blocks, optionally compresses the data, applies a MAC, encrypts, and transmits the result. Received data are decrypted, verified, decompressed, and reassembled, then delivered to higher level clients.

Session and Connection States.

An SSL session is stateful. It is the responsibility of the SSL handshake protocol to coordinate the states of the client and server, thereby allowing the protocol state machines of each to operate consistently, despite the fact that the state is not exactly parallel. Logically the state is represented twice, once as the current operating state, and (during the handshake protocol) again as the pending state. Additionally, separate read and write states are maintained. When the client or server receives a change cipher spec message, it copies the pending read state into the current read state. When the client or server sends a change cipher spec message, it copies the pending write state into the current write state. When the handshake negotiation is complete, the client and server exchange change cipher spec messages, and then communicate using the newly agreed upon cipher spec.

An SSL session may include multiple secure connections. In addition, parties may have multiple simultaneous sessions.

The session state includes the following elements:
session identifier: An arbitrary byte sequence chosen by the server to identify an active or resumable session state peer certificate X509.v3 certificate of the peer. This element of the state may be null.

compression method: The algorithm used to compress data prior to encryption.

cipher spec: Specifies the bulk data encryption algorithm (such as null and DES) and a MAC algorithm (such as MD5 or SHA). It also defines cryptographic attributes such as the hash_size.

master secret: 48-byte secret shared between the client and server.

is resumable: A flag indicating whether the session can be used to initiate new connections.

The connection state includes the following elements:

server and client random: Byte sequences that are chosen by the server and client for each connection.

server write MAC secret: The secret used in MAC operations on data written by the server.

client write MAC secret: The secret used in MAC operations on data written by the client.

server write key: The bulk cipher key for data encrypted by the server and decrypted by the client.

client write key: The bulk cipher key for data encrypted by the client and decrypted by the server.

initialization vectors: When a block cipher in CBC mode is used, an initialization vector (IV) is maintained for each key. This field is first initialized by the SSL handshake protocol. Thereafter the final ciphertext block from each record is preserved for use with the following record.

sequence numbers: Each party maintains separate sequence numbers for transmitted and received messages for each connection. When a party sends or receives a change cipher spec message, the appropriate sequence number is set to zero. Sequence numbers are of type uint64 and may not exceed 264-1.

The SSL Record Layer receives uninterpreted data from higher layers in non-empty blocks of arbitrary size.

The record layer fragments information blocks into SSLPlaintext records of 214 bytes or less. Client message boundaries are not preserved in the record layer (i.e. multiple client messages of the same ContentType may be coalesced into a single SSLPlaintext record):

struct {
  uint8 major, minor;
} ProtocolVersion;
enum {
  change_cipher_spec(20), alert(21), handshake(22),
  application_data(23), (255)
} ContentType;
struct {
  ContentType type;
  ProtocolVersion version;
  uint16 length;
  opaque fragment[SSLPlaintext.length];
} SSLPlaintext;

type: The higher level protocol used to process the enclosed fragment.

version: The version of protocol being employed. This document describes SSL Version 3.0).

length: The length (in bytes) of the following SSLPlaintext.fragment. The length should not exceed 214.

fragment: The application data. These data are transparent and treated as an independent block to be dealt with by the higher level protocol specified by the type field.

Note: Data of different SSL Record layer content types may be interleaved. Application data is generally of lower precedence for transmission than other content types.

Record Compression and Decompression.

All records are compressed using the compression algorithm defined in the current session state. There is always an active compression algorithm, however initially it is defined as CompressionMethod.null. The compression algorithm translates an SSLPlaintext structure into an SSLCompressed structure. Compression functions erase their state information whenever the CipherSpec is replaced.

Note: The CipherSpec is part of the session state. References to fields of the CipherSpec are made throughout this document using presentation syntax. Compression must be lossless and may not increase the content length by more than 1024 bytes. If the decompression function encounters an SSLCompressed.fragment that would decompress to a length in excess of 214 bytes, it should issue a fatal decompression_failure alert:

struct {
  ContentType type; /* same as SSLPlaintext.type */
  ProtocolVersion version; /* same as SSLPlaintext.version */
  uint16 length;
  opaque fragment[SSLCompressed.length];
} SSLCompressed;

length: The length (in bytes) of the following SSLCompressed.fragment. The length should not exceed 214+1024.

fragment: The compressed form of SSLPlaintext.fragment.

Note: A CompressionMethod.null operation is an identity operation; no fields are altered.

Implementation note: Decompression functions are responsible for ensuring that messages cannot cause internal buffer overflows.

All records are protected using the encryption and MAC algorithms defined in the current CipherSpec. There is always an active CipherSpec, however initially it is SSL_NULL_WITH_NULL_NULL, which does not provide any security.

Once the handshake is complete, the two parties have shared secrets which are used to encrypt records and compute keyed message authentication codes (MACs) on their contents. The techniques used to perform the encryption and MAC operations are defined by the CipherSpec and constrained by CipherSpec.cipher_type. The encryption and MAC functions translate an SSLCompressed structure into an SSLCiphertext. The decryption functions reverse the process. Transmissions also include a sequence number so that missing, altered, or extra messages are detectable:

struct {
  ContentType type;
  ProtocolVersion version;
  uint16 length;
  select (CipherSpec.cipher-type) {
    case stream: GenericStreamCipher;
    case block: GenericBlockCipher;
  } fragment;
} SSLCiphertext;

type: The type field is identical to SSLCompressed.type.

version: The version field is identical to SSLCompressed.version.

length: The length (in bytes) of the following SSLCiphertext.fragment. The length may not exceed 214+2048.

fragment: The encrypted form of SSLCompressed.fragment, including the MAC.

Stream ciphers convert SSLCompressed.fragment structures to and from stream SSLCiphertext.fragment structures:

```
stream-ciphered struct {
opaque content[SSLCompressed.length];
opaque MAC[CipherSpec.hash_size];
} GenericStreamCipher;
```
The MAC is generated as:
hash(MAC_write_secret+pad_2+hash (MAC_write_secret+pad_1+seq_num+length+content));
where "+" denotes concatenation.

pad_1: The character 0x36 repeated 48 time for MD5 or 40 times for SHA.

pad_2: The character 0x5c repeated the same number of times.

seq_num: The sequence number for this message.

hash: The hashing algorithm derived from the cipher suite.

Note that the MAC is computed before encryption. The stream cipher encrypts the entire block, including the MAC. For stream ciphers that do not use a synchronization vector (such as RC4), the stream cipher state from the end of one record is simply used on the subsequent packet. If the CipherSuite is SSL_NULL_WITH_NULL_NULL, encryption consists of the identity operation (i.e. the data is not encrypted and the MAC size is zero implying that no MAC is used).

SSLCiphertext.length is SSLCompressed.length plus CipherSpec.hash_size.

For block ciphers (such as RC2 or DES), the encryption and MAC functions convert SSLCompressed.fragment structures to and from block SSLCiphertext.fragment structures:

```
block-ciphered struct {
    opaque content[SSLCompressed.length];
    opaque MAC[CipherSpec.hash_size];
    uint8 padding[GenericBlockCipher.padding_length];
    uint8 padding_length;
} GenericBlockCipher;
``` padding: Padding that is added to force the length of the plaintext to be a multiple of the block cipher's block length.

padding_length: The length of the padding must be less than the cipher's block length and may be zero. The padding length should be such that the total size of the GenericBlockCipher structure is a multiple of the cipher's block length.

The encrypted data length (SSLCiphertext.length) is one more than the sum of SSLCompressed.length, CipherSpec.hash_size, and padding-length.

Note: With CBC block chaining the initialization vector (IV) for the first record is provided by the handshake protocol. The IV for subsequent records is the last ciphertext block from the previous record.

The change cipher spec protocol exists to signal transitions in ciphering strategies. The protocol consists of a single message, which is encrypted and compressed under the current (not the pending) CipherSpec. The message consists of a single byte of value 1:

```
struct {
    enum {change_cipher_spec(1), (255)} type;
} ChangeCipherSpec;
```

The change cipher spec message is sent by both the client and server to notify the receiving party that subsequent records are protected under the just negotiated CipherSpec and keys. Reception of this message causes the receiver to copy the read pending state into the read current state. Separate read and write states are maintained by both the SSL client and server. When the client or server receives a change cipher spec message, it copies the pending read state into the current read state. When the client or server writes a change cipher spec message, it copies the pending write state into the current write state. The client sends a change cipher spec message following handshake key exchange and certificate verify messages (if any), and the server sends one after successfully processing the key exchange message it received from the client. An unexpected change cipher spec message should generate an unexpected message alert. When resuming a previous session, the change cipher spec message is sent after the hello messages.

Alert Protocol.

One of the content types supported by the SSL Record layer is the alert type. Alert messages convey the severity of the message and a description of the alert. Alert messages with a level of fatal result in the immediate termination of the connection. In this case, other connections corresponding to the session may continue, but the session identifier must be invalidated, preventing the failed session from being used to establish new connections. Like other messages, Alert messages are encrypted and compressed, as specified by the current connection state:

```
enum {warning(1), fatal(2), (255)} AlertLevel;
enum {
    close_notify(0),
    unexpected_message(10),
    bad_record_mac(20),
    decompression_failure(30),
    handshake_failure(40), no_certificate(41), bad_certificate(42),
    unsupported_certificate(43), certificate_revoked (44),
    certificate_expired (45), certificate_unknown (46),
    illegal_parameter (47)
    (255)
} AlertDescription;
struct {
    AlertLevel level;
    AlertDescription description;
} Alert;
```

Closure Alerts.

The client and the server must share knowledge that the connection is ending to avoid a truncation attack. Either party may initiate the exchange of closing messages:

close_notify

This message notifies the recipient that the sender will not send any more messages on this connection. The session becomes unresumable if any connection is terminated without proper close_notify messages with level equal to warning.

Error Alerts.

Error handling in the SSL Handshake protocol is very simple. When an error is detected, the detecting party sends a message to the other party. Upon transmission or receipt of an fatal alert message, both parties immediately close the connection. Servers and clients are required to forget any session-identifiers, keys, and secrets associated with a failed connection. The following error alerts are defined:

unexpected_message: An inappropriate message was received. This alert is always fatal and should never be observed in communication between proper implementations.

bad_record_mac: This alert is returned if a record is received with an incorrect MAC. This message is always fatal.

decompression_failure: The decompression function received improper input (e.g. data that would expand to excessive length). This message is always fatal.

handshake_failure: Reception of a handshake_failure alert message indicates that the sender was unable to negotiate an acceptable set of security parameters given the options available. This is a fatal error.

no_certificate: A no_certificate alert message may be sent in response to a certification request if no appropriate certificate is available.

bad_certificate: A certificate was corrupt, contained signatures that, for example, did not verify correctly.

unsupported_certificate: A certificate was of an unsupported type.

certificate_revoked: A certificate was revoked by its signer.

certificate-expired: A certificate has expired or is not currently valid.

certificate_unknown: Some other (unspecified) issue arose in processing the certificate, rendering it unacceptable.

illegal_parameter: A field in the handshake was out of range or inconsistent with other fields. This is always fatal.

Handshake Protocol Overview.

Figure 3:
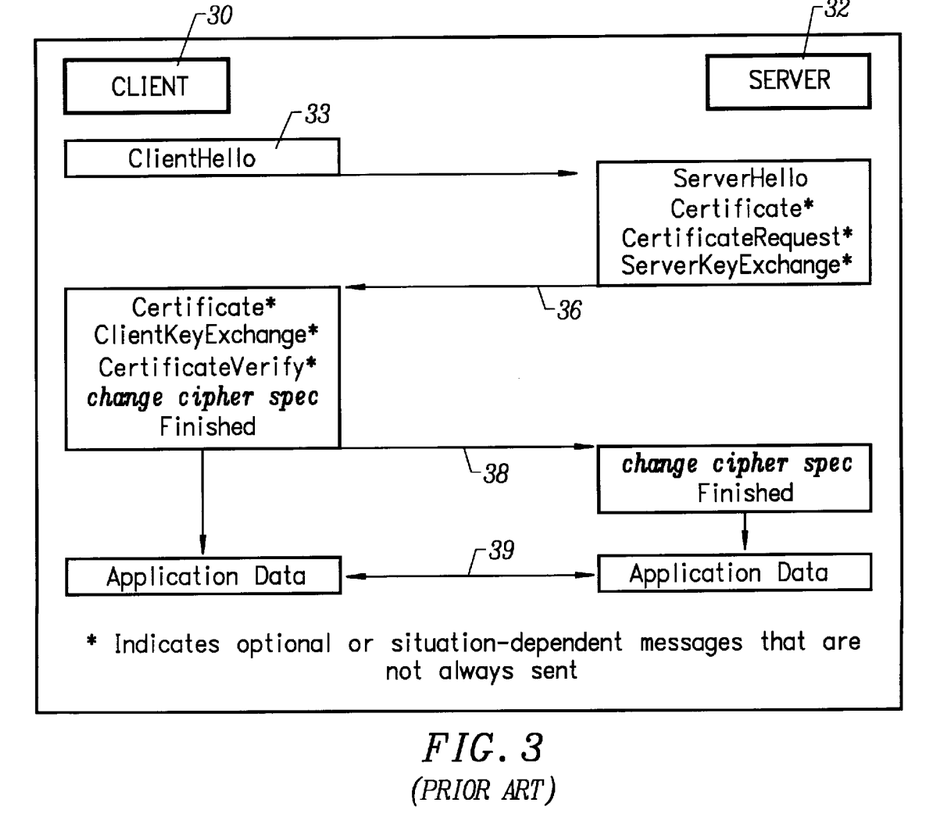
FIG. 3 is a flow diagram of a client/server handshake.

The cryptographic parameters of the session state are produced by the SSL handshake protocol, which operates on top of the SSL Record Layer. When a SSL client and server first start communicating, they agree on a protocol version, select cryptographic algorithms, optionally authenticate each other, and use public-key encryption techniques to generate shared secrets. These processes are performed in the handshake protocol, which can be summarized as follows (see FIG. 3):

The client 30 sends a client hello message 33 to which the server must respond with a server hello message 35, or else a fatal error occurs and the connection fails. The client hello and server hello are used to establish security enhancement capabilities between client and server.

The client hello and server hello establish the following attributes: protocol version, session ID, cipher suite, and compression method. Additionally, two random values are generated and exchanged: ClientHello.random and ServerHello.random.

Following the hello messages, the server sends its certificate 36, if it is to be authenticated. Additionally, a server key exchange message may be sent, if it is required (e.g. if their server has no certificate, or if its certificate is for signing only). If the server is authenticated, it may request a certificate from the client, if that is appropriate to the cipher suite selected.

Now the server sends the server hello done message, indicating that the hello-message phase of the handshake is complete. The server then waits for a client response.

If the server has sent a certificate request message, the client must send either the certificate message or a no certificate alert. The client key exchange message is now sent 38. The content of that message depends on the public key algorithm selected between the client hello and the server hello. If the client has sent a certificate with signing ability, a digitally signed certificate verify message is sent to explicitly verify the certificate.

At this point, a change cipher spec message is sent by the client, and the client copies the pending Cipher Spec into the current Cipher Spec. The client then immediately sends the finished message under the new algorithms, keys, and secrets. In response, the server sends its own change cipher spec message, transfer the pending to the current Cipher Spec, and send its Finished message under the new Cipher Spec. At this point, the handshake is complete and the client and server may begin to exchange application layer data 39.

Note: To help avoid pipeline stalls, ChangeCipherSpec is an independent SSL Protocol content type, and is not actually an SSL handshake message.

Figure 4:
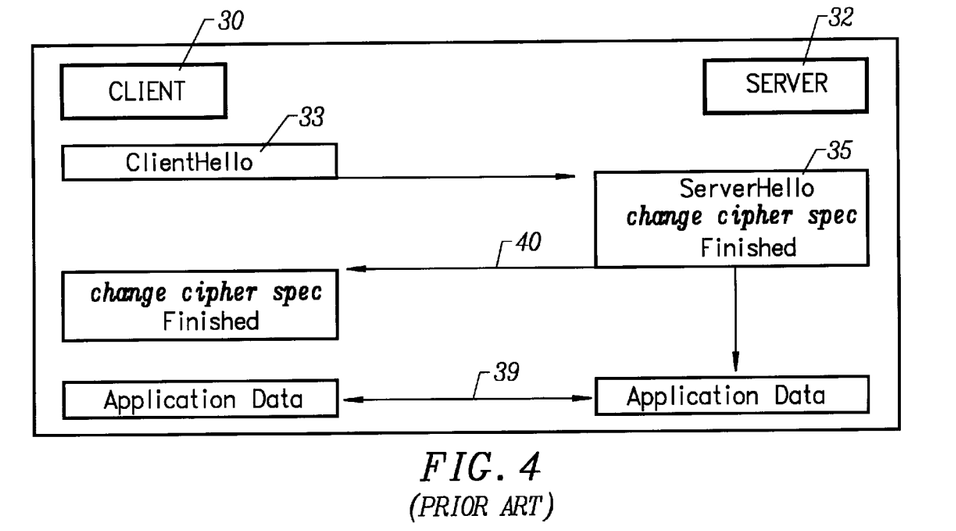
FIG. 4 is a flow diagram of a client/server handshake to resume a session.

When the client and server decide to resume a previous session or duplicate an existing session (instead of negotiating new security parameters) the message flow is as follows (see FIG. 4):

The client 30 sends a client hello 33 using the Session ID of the session to be resumed. The server 32 then checks its session cache for a match. If a match is found, and the server is willing to reestablish the connection under the specified session state, it sends a server hello 35 with the same Session ID value. At this point, both client and server must send change cipher spec messages 40 and proceed directly to finished messages. Once the reestablishment is complete, the client and server may begin to exchange application layer data 39. If a Session ID match is not found, the server generates a new session ID and the SSL client and server perform a full handshake.

Handshake Protocol.

The SSL Handshake Protocol is one of the defined higher level clients of the SSL Record Protocol. This protocol is used to negotiate the secure attributes of a session. Handshake messages are supplied to the SSL Record Layer, where they are encapsulated within one or more SSLPlaintext structures, which are processed and transmitted as specified by the current active session state:

enum {
    hello_request(0), client_hello(1), server_hello(2),
    certificate(11), server_key_exchange (12), certificate_request(13),
    server_hello_done(14), certificate_verify(15), client_key_exchange(16),
    finished(20), (255)
} HandshakeType;

struct {
    HandshakeType msg_type; /* type of handshake message */
    uint24 length; /* # bytes in handshake message body */
    select (HandshakeType) {
    case hello_request: HelloRequest;
    case client_hello: ClientHello;
    case server_hello: ServerHello;
    case certificate: Certificate;
    case server_key_exchange: ServerKeyExchange;
    case certificate_request: CertificateRequest;
    case server_hello_done: ServerHelloDone;
    case certificate_verify: CertificateVerify;
    case client_key_exchange: ClientKeyExchange;
    case finished: Finished;
    } body;
} Handshake;

The handshake protocol messages are presented in the order they must be sent. Sending handshake messages in an unexpected order results in a fatal error.

Hello Messages.

The hello phase messages are used to exchange security enhancement capabilities between the client and server. When a new session begins, the CipherSpec encryption, hash, and compression algorithms are initialized to null. The current CipherSpec is used for renegotiation messages.

Hello Request.

The hello request message may be sent by the server at any time, but is ignored by the client if the handshake protocol is already underway. It is a simple notification that the client should begin the negotiation process anew by sending a client hello message when convenient.

Note: Because handshake messages are intended to have transmission precedence over application data, it is expected that the negotiation begin in no more than one or two times the transmission time of a maximum length application data message.

After sending a hello request, servers should not repeat the request until the subsequent handshake negotiation is complete. A client that receives a hello request while in a handshake negotiation state should ignore the message.

The structure of a hello request message is as follows:
struct { } HelloRequest;
Client Hello.

When a client first connects to a server it is required to send the client hello as its first message. The client can also send a client hello in response to a hello request or on its own initiative in order to renegotiate the security parameters in an existing connection. The client hello message includes a random structure, which is used later in the protocol:
struct {
    uint32 gmt_unix_time;
    opaque random_bytes[28];
} Random;
gmt_unix_time: The current time and date in standard UNIX 32-bit format according to the sender's internal clock. Clocks are not required to be set correctly by the basic SSL Protocol. Higher level or application protocols may define additional requirements:
random_bytes: 28 bytes generated by a secure random number generator.

The client hello message includes a variable length session identifier. If not empty, the value identifies a session between the same client and server whose security parameters the client wishes to reuse. The session identifier may be from an earlier connection, this connection, or another currently active connection. The second option is useful if the client only wishes to update the random structures and derived values of a connection, while the third option makes it possible to establish several simultaneous independent secure connections without repeating the full handshake protocol. The actual contents of the SessionID are defined by the server:

opaque SessionID<0.32>;

Servers must not place confidential information in session identifiers or let the contents of fake session identifiers cause any breach of security.

The CipherSuite list, passed from the client to the server in the client hello message, contains the combinations of cryptographic algorithms supported by the client in order of the client's preference (first choice first). Each CipherSuite defines both a key exchange algorithm and a CipherSpec. The server selects a cipher suite or, if no acceptable choices are presented, returns a handshake failure alert and close the connection:
uint8 CipherSuite[2]; /* Cryptographic suite selector*/

The client hello includes a list of compression algorithms supported by the client, ordered according to the client's preference. If the server supports none of those specified by the client, the session must fail:
enum {null(0), (255)} CompressionMethod;
The structure of the client hello is as follows:
struct {
    ProtocolVersion client_version;
    Random random;
    SessionID session_id;
    CipherSuite cipher_suites<2 . . . 216-1>;
    CompressionMethod compression_methods<1 . . .28-1>;
} ClientHello;
client_version: The version of the SSL protocol by which the client wishes to communicate during this session. This should be the most recent (highest valued) version supported by the client.
random: A client-generated random structure.
session_id: The ID of a session the client wishes to use for this connection. This field should be empty if no session_id is available or the client wishes to generate new security parameters.
cipher_suites: This is a list of the cryptographic options supported by the client, sorted with the client's first preference first. If the session_id field is not empty (implying a session resumption request) this vector must include at least the cipher_suite from that session.
compression_methods: This is a list of the compression methods supported by the client, sorted by client preference. If the session_id field is not empty (implying a session resumption request) this vector must include at least the compression_method from that session. All implementations must support CompressionMethod.null.

After sending the client hello message, the client waits for a server hello message. Any other handshake message returned by the server except for a hello request is treated as a fatal error.

Application data may not be sent before a finished message has been sent. Transmitted application data are known to be insecure until a valid finished message has been received. This absolute restriction is relaxed if there is a current, non-null encryption on this connection.
Server Hello.

The server processes the client hello message and responds with either a handshake_failure alert or server hello message:
struct{
    ProtocolVersion server_version;
    Random random;
    SessionID session_id;
    CipherSuite cipher_suite;
    CompressionMethod compression_method;
} ServerHello;
server_version: This field contains the lower of that suggested by the client in the client hello and the highest supported by the server.
random: This structure is generated by the server and must be different from (and independent of) ClientHello.random.
session_id: This is the identity of the session corresponding to this connection. If the ClientHello.session_id was non-empty, the server looks in its session cache for a match. If a match is found and the server is willing to establish the new connection using the specified session state, the server responds with the same value as was supplied by the client. This indicates a resumed session and dictates that the parties must proceed directly to the finished messages. Otherwise this field contains a different value identifying the new session. The server may return an empty session_id to indicate that the session is not cached and therefore cannot be resumed.
cipher_suite: The single cipher suite selected by the server from the list in ClientHello.cipher_suites. For resumed sessions this field is the value from the state of the session being resumed.
compression_method: The single compression algorithm selected by the server from the list in ClientHello.compression_methods. For resumed sessions this field is the value from the resumed session state.

Server Certificate.

If the server is to be authenticated (which is generally the case), the server sends its certificate immediately following the server hello message. The certificate type must be appropriate for the selected cipher suite's key exchange algorithm, and is generally an X.509.v3 certificate (or a modified X.509 certificate in the case of Fortezza). The same message type is used for the client's response to a server certificate request message:

opaque ASN.1Cert<1 . . . 224-1>;
struct {
    ASN.1 Cert certificate_list<1 . . . 224-1>;
} Certificate;

certificate_list: This is a sequence (chain) of X.509.v3 certificates, ordered with the sender's certificate first and the root certificate authority last.

Note: PKCS #7 is not used as the format for the certificate vector because PKCS #6 extended certificates are not used. Also PKCS #7 defines a SET rather than a SEQUENCE, making the task of parsing the list more difficult.

Server Key Exchange Message.

The server key exchange message is sent by the server if it has no certificate, has a certificate only used for signing (e.g. DSS certificates, signing-only RSA certificates), or fortezza/DMS key exchange is used. This message is not used if the server certificate contains Diffie-Hellman [DH1] parameters.

Note: According to current U.S. export law, RSA moduli larger than 512 bits may not be used for key exchange in software exported from the U.S. With this message, larger RSA keys may be used as signature-only certificates to sign temporary shorter RSA keys for key exchange:

enum {rsa, diffie_heilman, fortezza_dms} KeyExchangeAlgorithm;
struct {
    opaque rsa modulus<1 . . . 216-1>;
    opaque rsa_exponent<1 . . . 216-1>;
} ServerRSAParams;

rsa_modulus: The modulus of the server's temporary RSA key.
rsa_exponent: The public exponent of the server's temporary RSA key.

struct {
    opaque dh_p<1 . . . 216-1>;
    opaque dh_g<1 . . . 216-1>;
    opaque dh_Ys<1 . . . 216-1>;
} ServerDHParams; /* Ephemeral DH parameters*/ dh_p: The prime modulus used for the Diffie-Hellman operation.
dh_g: The generator used for the Diffie-Hellman operation.
dh_Ys: The server's Diffie-Hellman public value (gX mod p).

struct{
opaque r_s [128];
} ServerFortezzaParams;

r_s: Server random number for Fortezza KEA (Key Exchange Algorithm).

struct {
    select (KeyExchangeAlgorithm){
    case diffie_hellman:
    ServerDHParams params;
    Signature signed_params;
    case rsa:
    ServerRSAParams params;
    Signature signed_params;
    case fortezza_dms:
    ServerFortezzaParams params;
    };
} ServerKeyExchange;

params: The server's key exchange parameters.
signed_params: A hash of the corresponding params value, with the signature appropriate to that hash applied.
md5_hash
    MD5(ClientHello.random+ServerHello.random+ServerParams);
sha_hash
    SHA(ClientHello.random+ServerHello.random+ServerParams);

enum {anonymous, rsa, dsa} SignatureAlgorithm;
digitally signed struct {
    select(SignatureAlgorithm){
    case anonymous: struct { };
    case rsa:
    opaque md5_hash[16];
    opaque sha_hash[20];
    case dsa:
    opaque sha_hash[20];
} Signature;

Certificate Request.

A non-anonymous server can optionally request a certificate from the client, if appropriate for the selected cipher suite:

opaque CertificateAuthority <0 . . . 224-1>;
enum {
    rsa_sign(1), dss_sign(2), rsa_fixed_dh(3), dss_fixed_dh(4),
    rsa_ephemeral_dh(5), dss_ephemeral_dh(6), fortezza_dms(20), (255)
} ClientCertificateType;
opaque DistinguishedName<1 . . . 216-1>;
struct {
    ClientCertificateType certificate_types<1 . . . 28-1>;
    DistinguishedName certificate_authorities<3 . . . 216-1>;
} CertificateRequest;

certificate_types: This field is a list of the types of certificates requested, sorted in order of the server's preference.
certificate_authorities: A list of the distinguished names of acceptable certificate authorities.

Note: DistinguishedName is derived from X509.
Note: It is a fatal handshake_failure alert for an anonymous server to request client identification.

Server Hello Done.

The server hello done message is sent by the server to indicate the end of the server hello and associated messages. After sending this message the server waits for a client response:

struct { } ServerHelloDone;

Upon receipt of the server hello done message the client should verify that the server provided a valid certificate if required and check that the server hello parameters are acceptable.

Client Certificate.

This is the first message the client can send after receiving a server hello done message. This message is only sent if the server requests a certificate. If no suitable certificate is available, the client should send a no certificate alert instead. This error is only a warning, however the server may respond with a fatal handshake failure alert if client authentication is required.

Note: Client Diffie-Hellman certificates must match the server specified Diffie-Hellman parameters.
Client Key Exchange Message.

The choice of messages depends on which public key algorithm(s) has (have) been selected:

```
struct {
  select (KeyExchangeAlgorithm) {
    case rsa: EncryptedPreMasterSecret;
    case diffie_heilman: ClientDiffieHellmanPublic;
    case fortezza_dms: FortezzaKeys;
  } exchange_keys;
} ClientKeyExchange;
```

The information to select the appropriate record structure is in the pending session state.
RSA Encrypted Premaster Secret Message.

If RSA is being used for key agreement and authentication, the client generates a 48-byte pre-master secret, encrypts it under the public key from the server's certificate or temporary RSA key from a server key exchange message, and sends the result in an encrypted premaster secret message:

```
struct {
  ProtocolVersion client_version;
  opaque random[46];
} PreMasterSecret;
``` client_version: The latest (newest) version supported by the client. This is used to detect version roll-back attacks.
random: 46 securely-generated random bytes.

```
struct {
  public-key-encrypted PreMasterSecret pre_master_secret;
} EncryptedPreMasterSecret;
``` pre_master_secret: This random value is generated by the client and is used to generate the master secret.
Fortezza Key Exchange Message.

Under Fortezza DMS, the client derives a Token Encryption Key (TEK) using Fortezza's Key Exchange Algorithm (KEA). The client's KEA calculation uses the public key in the server's certificate along with private parameters in the client's token. The client sends public parameters needed for the server to generate the TEK, using its own private parameters. The client generates session keys, wraps them using the TEK, and sends the results to the server. The client generates IV's for the session keys and TEK and sends them also. The client generates a random 48-byte premaster secret, encrypts it using the TEK, and sends the result:

```
struct {
  opaque y_c<0 ... 128>;
  opaque r_c[128];
  opaque y_signature[20];
  opaque wrapped_client_write_key[12];
  opaque wrapped_server_write_key[12];
  opaque client_write_iv[24];
  opaque server_write_iv[24];
  opaque master_secret_iv[24];
  block-ciphered opaque encrypted_pre_master_secret[48];
} FortezzaKeys;
``` y_signature: y_singnature is the signature of the KEA public key, signed with the client's DSS private key.
y_c: The client's Yc value (public key) for the KEA calculation. If the client has sent a certificate, and its KEA public key is suitable, this value must be empty because the certificate already contains this value. If the client sent a certificate without a suitable public key, y_c is used and y_singnature is the KEA public key signed with the client's DSS private key. For this value to be used, it must be between 64 and 128 bytes.
r_c: The client's Rc value for the KEA calculation.
wrapped_client_write_key: This is the client's write key, wrapped by the TEK.
wrapped_server_write_key: This is the server's write key, wrapped by the TEK.
client_write_iv: This is the IV for the client write key.
server_write_iv: This is the IV for the server write key.
master_secret_iv: This is the IV for the TEK used to encrypt the pre-master secret.
pre_master_secret: This is a random value, generated by the client and used to generate the master secret. In the above structure, it is encrypted using the TEK.
Client Diffie-Hellman Public Value.

This structure conveys the client's Diffie-Hellman public value (Yc) if it was not already included in the client's certificate. The encoding used for Yc is determined by the enumerated PublicValueEncoding:
enum {implicit, explicit} PublicValueEncoding;
implicit: If the client certificate already contains the public value, then it is implicit and Yc does not need to be sent again.
explicit: Yc needs to be sent.

```
struct {
  select (PublicValueEncoding) {
    case implicit: struct { };
    case explicit: opaque dh_Yc<1 ... 216-1>;
  } dh-public;
} ClientDiffieHellmanPublic;
``` dh_Yc: The client's Diffie-Hellman public value (Yc).
Certificate Verify.

This message is used to provide explicit verification of a client certificate. This message is only sent following any client certificate that has signing capability (i.e. all certificates except those containing fixed Diffie-Hellman parameters):

```
struct {
  Signature signature;
} CertificateVerify;
```

CertificateVerify.signature.md5_hash
  MD5(master_secret+pad2+MD5(handshake_messages+master_secret+pad1));
Certificate.signature.sha_hash
  SHA(master_secret+pad2+SHA(handshake_messages+master_secret+pad1));

Here handshake_messages refers to all handshake messages starting at client hello up to but not including this message.
Finished.

A finished message is always sent immediately after a change cipher specs message to verify that the key exchange and authentication processes were successful. The finished message is the first protected with the just negotiated algorithms, keys, and secrets. No acknowledgment of the finished message is required. Parties may begin sending confidential data immediately after sending the finished message. Recipients of finished messages must verify that the contents are correct:
enum {client(0×434C4E54), server(0×53525652)} Sender;

```
struct {
  opaque md5_hash[16];
  opaque sha_hash[20];
} Finished;
``` md5_hash

MD5(master_secret+pad2+MD5(handshake_messages+Sender+master_secret+pad1));

sha_hash

SHA(master_secret+pad2+SHA(handshake_messages+Sender+master_secret+pad1));

The hash contained in finished messages sent by the server incorporate Sender.server; those sent by the client incorporate Sender.client. The value handshake_messages includes all handshake messages starting at client hello up to, but not including, the finished messages. This may be different from handshake_messages because it would include the certificate verify message (if sent).

Note: Change cipher spec messages are not handshake messages and are not included in the hash computations.

Application Data Protocol.

Application data messages are carried by the Record Layer and are fragmented, compressed and encrypted based on the current connection state. The messages are treated as transparent data to the record layer.

Although the invention is described herein with reference to the preferred embodiment, one skilled in the art will readily appreciate that other applications may be substituted for those set forth herein without departing from the spirit and scope of the present invention. For example, the process described above first negotiates an export grade session then, if the certificate is approved, the process renegotiates (i.e. steps up) to a strong cryptography session. This is presently the most efficient implementation of the invention because most servers are not currently approved for step up. If most SSL servers are approved for step up, it would be desirable to reverse the order. In that case, the following steps are performed:

Negotiate an SSL session using strong cryptography;

If the server's certificate is approved, send data using strong cryptography; and If the server's certificate is not approved, renegotiate down to a weaker export grade cipher.

This ordering requires one handshake for approved servers and two handshakes for non-approved servers. The other ordering requires one handshake for non-approved servers and two handshakes for approved servers. This embodiment of the invention may be thought of as an SSL step down. In the future, it may be desirable to change which ordering used by default, and/or it may be made a preference that is under user or administrator control.

Accordingly, the invention should only be limited by the claims included below.

What is claimed is:

1. A process for determining the strongest legally permissible level of cryptographic service in an electronic network, comprising the steps of:

performing a first handshake between a client and a server to establish a session that uses export strength encryption, wherein a connection is established using an export cipher suite;

examining with said client a server certificate obtained as part of said first handshake;

transferring application data that are protected by said export cipher suite if said server is not approved for a stronger level of cryptographic service;

initiating a second handshake allowing a stronger cipher suite if said server is approved for a stronger level of cryptographic service; and transferring application data that are protected by said stronger cipher suite;

wherein said server certificate is required by said client to determine if said server is approved;

wherein said server certificate is not available to said client at the time that it must send said list of cipher suites during said first handshake; and wherein said first handshake must be performed with weaker, export strength cryptography.

2. The process of claim 1, wherein said session is a secure socket layer (SSL) session.

3. The process of claim 1, further comprising the step of:

sending with said client sends a list of cipher suites said client allows before said server sends said server certificate.

4. The process of claim 1, wherein said client has said server certificate and can determine if said server is approved for stronger cryptography after said first handshake is complete.

5. The process of claim 4, wherein said client performs said second handshake with said expanded list of cipher suites.

6. The process of claim 1, further comprising the step of:

verifying that said server is approved for stronger cryptography based on said server certificate.

7. The process of claim 6, wherein said server certificate comprises a certificate chain consisting of said server certificate, zero or more intermediate certification authority (CA) certificates, and a trusted root CA certificate.

8. The process of claim 6, wherein said verification step comprises the steps of:

initiating a session;

providing with said server a server certificate, wherein said server certificate and any intermediate certification authority (CA) certificates must contain a certificate extension, wherein a trusted root CA certificate must be on a list of CAs that is built into said client and that are known to be approved for issuing special certificates that allow for the use of stronger cryptography, wherein said list is built into said client and is configurable by a user; and approving said certificate for stronger cryptography if said certificate is on said list, wherein session may proceed using strong encryption.

9. The process of claim 8, said verification step further comprising the steps of:

determining if said certificate has an approved extension if said certificate is not on said list;

finding an issuer certificate; and comparing said issuer certificate to said list again if said certificate does not have an approved extension.

10. The process of claim 9, wherein said certificate extension is an extended key usage extension.

11. The process of claim 1, wherein the order in which said handshakes are performed is reversed.

12. The process of claim 11, comprising the steps of:

negotiating a session using strong cryptography;

sending data using strong cryptography if said server certificate is approved; and renegotiating down to a weaker export grade cipher suite if said server certificate is not approved.

13. The process of claim 1, wherein one handshake is required for approved servers and two handshakes are required for non-approved servers.

14. The process of claim 1, wherein one handshake is required for non-approved servers and two handshakes a required for approved servers.

15. An apparatus for determining the strongest legally permissible level of cryptographic service in an electronic network, comprising:

means for performing a first handshake between a client and a server to establish a session that uses export strength encryption, wherein a connection is established using an export cipher suite;

means for examining with said client a server certificate obtained as part of said first handshake;

means for transferring application data that are protected by said export cipher suite if said server is not approved for a stronger level of cryptographic service;

means for initiating a second handshake allowing a stronger cipher suite if said server is approved for a stronger level of cryptographic service; and means for transferring application data that are protected by said stronger cipher suite;

wherein said server certificate is required by said client to determine if said server is approved;

wherein said server certificate is not available to said client at the time that it must send said list of cipher suites during said first handshake; and wherein said first handshake must be performed with weaker, export strength cryptography.

16. The apparatus of claim 15, wherein said session is a secure socket layer (SSL) session.

17. The apparatus of claim 15, further comprising:

means for sending with said client sends a list of cipher suites said client allows before said server sends said server certificate.

18. The apparatus of claim 17, wherein said client has said server certificate and can determine if said server is approved for stronger cryptography after said first handshake is complete.

19. The apparatus of claim 18, wherein said client performs said second handshake with said expanded list of cipher suites.

20. The apparatus of claim 15, further comprising:

means for verifying that said server is approved for stronger cryptography based on said server certificate.

21. The apparatus of claim 20, wherein said server certificate comprises a certificate chain consisting of said server certificate, zero or more intermediate certification authority (CA) certificates, and a trusted root CA certificate.

22. The apparatus of claim 20, wherein said verification means comprises:

means for initiating a session;

means for providing with said server a server certificate, wherein said server certificate and any intermediate certification authority (CA) certificates must contain an certificate extension, wherein a trusted root CA certificate must be on a list of CAs that is built into said client and that are known to be approved for issuing special certificates that allow for the use of stronger cryptography, wherein said list is built into said client and is configurable by a user; and means for approving said certificate for stronger cryptography if said certificate is on said list, then the certificate, wherein session may proceed using strong encryption.

23. The apparatus of claim 22, said verification means further comprising:

means for determining if said certificate has an approved extension if said certificate is not on said list;

means for finding an issuer certificate; and means for comparing said issuer certificate to said list again if said certificate does not have an approved extension.

24. The apparatus of claim 23, wherein said certificate extension is an extended key usage extension.

25. The apparatus of claim 15, wherein the order in which said handshakes are performed is reversed.

26. The apparatus of claim 25 comprising:

means for negotiating a session using strong cryptography;

means for sending data using strong cryptography if said server certificate is approved; and means for renegotiating down to a weaker export grade cipher suite if said server certificate is not approved.

27. The apparatus of claim 15, wherein one handshake is required for approved servers and two handshakes are required for non-approved servers.

28. The apparatus of claim 15, wherein one handshake is required for non-approved servers and two handshakes a required for approved servers.

* * * * *